United States Patent
Lin et al.

(10) Patent No.: US 12,491,522 B2
(45) Date of Patent: Dec. 9, 2025

(54) WATER OUTLET DEVICE

(71) Applicant: FUJIAN XIHE SANITARY WARE TECHNOLOGY CO., LTD., Fujian (CN)

(72) Inventors: Xiaofa Lin, Fujian (CN); Xiaoshan Lin, Fujian (CN); Yonghui Zhang, Fujian (CN); Zhiwei Chen, Fujian (CN); Pansheng Liang, Fujian (CN); Xiaoqing Deng, Fujian (CN); Qiqiao Liu, Fujian (CN)

(73) Assignee: FUJIAN XIHE SANITARY WARE TECHNOLOGY CO., LTD., Fujian (CN)

( * ) Notice: Subject to any disclaimer, the term of this patent is extended or adjusted under 35 U.S.C. 154(b) by 281 days.

(21) Appl. No.: 18/336,965

(22) Filed: Jun. 17, 2023

(65) Prior Publication Data

US 2024/0416367 A1    Dec. 19, 2024

(51) Int. Cl.
*B05B 1/30* (2006.01)
*F16K 31/44* (2006.01)

(52) U.S. Cl.
CPC ........... *B05B 1/3026* (2013.01); *F16K 31/44* (2013.01)

(58) Field of Classification Search
CPC .......... B05B 1/3026; B05B 1/18; B05B 1/30; B05B 1/3086; B05B 12/002; B05B 12/0022; F16K 31/44
See application file for complete search history.

(56) References Cited

U.S. PATENT DOCUMENTS

| | | | | |
|---|---|---|---|---|
| 5,360,172 A | * | 11/1994 | Wang | B05B 1/3026 |
| | | | | 251/263 |
| 11,458,488 B2 | * | 10/2022 | Rogers | B05B 1/1627 |
| 2013/0161549 A1 | * | 6/2013 | Zhou | F16K 31/44 |
| | | | | 251/213 |
| 2018/0001331 A1 | * | 1/2018 | Lin | E03C 1/0409 |
| 2018/0050353 A1 | * | 2/2018 | Lin | B05B 1/3026 |
| 2018/0318859 A1 | * | 11/2018 | Gong | F16K 11/0716 |
| 2019/0316705 A1 | * | 10/2019 | Wang | F16K 3/02 |
| 2020/0248438 A1 | * | 8/2020 | Wang | E03C 1/0405 |

(Continued)

FOREIGN PATENT DOCUMENTS

| | | | | |
|---|---|---|---|---|
| CN | 201537542 U | * | 8/2010 | |
| CN | 216779127 | | 6/2022 | |
| WO | WO-2015135566 A1 | * | 9/2015 | ......... B05B 12/0022 |

*Primary Examiner* — Darren W Gorman
(74) *Attorney, Agent, or Firm* — JCIPRNET (57) ABSTRACT

A water outlet device includes a water outlet body and a movable shaft, the water outlet body is provided with a water inflow path, a water outflow path and a mounting channel; the mounting channel extends along a first direction with one end of the mounting channel communicating with the water inflow path, the other end of the mounting channel closed, and a side wall of the mounting channel provided with a first water passing hole communicated with the water outflow path; the movable shaft is slidably arranged in the mounting channel and is driven to slide relative to the water outlet body, and is provided with a water passing channel along the first direction; a side wall of the water passing channel is provided with a second water passing hole being opposite or staggered from the first water passing hole when the movable shaft slides.

10 Claims, 9 Drawing Sheets

(56) References Cited

U.S. PATENT DOCUMENTS

2024/0139760 A1\* 5/2024 Chen ..................... B05B 9/01
2024/0286149 A1\* 8/2024 Chen ..................... B05B 15/40
2024/0359195 A1\* 10/2024 Kuo ..................... B05B 1/3026

\* cited by examiner

WATER OUTLET DEVICE

BACKGROUND

Technical Field

The disclosure relates to the technical field of shower heads or spray guns, particularly to a water outlet device.

Description of Related Art

In the prior art, in order to realize a water suspending function of a shower head or a spray gun, a connection/disconnection structure is usually arranged at a handle of the shower head or the spray gun. The most applied connection/disconnection structure realizes water passing and water stopping in such a manner that a push button drives a movable shaft in a water path to open or close a water passing opening. In the structure, in a state that the water path is disconnected, since the water pressure at the end of the movable shaft away from a water inflow direction is small and the end thereof facing the water inflow direction needs to bear a large water inflow pressure, during use, it is heavy for a user to open the water path and such operation is inconvenient. In order to solve the problem, the movable shaft and the water passing opening in the connection/disconnection structure in the prior art are usually in a clearance fit relation. As a result of the clearance fit relation, in order to relieve the pressure and reduce the pressure on the movable shaft, the movable shaft allows a part of water flow to flow from the water passing opening when the water path is closed. That is, water leakage phenomenon still exists in the connection/disconnection structure even when the water path is disconnected, and complete water suspension cannot be realized, such that the using requirement of the user cannot be met well. Moreover, in order to avoid excessive water leakage, the pressure relief effect thus cannot be too obvious, and the improvement of the operating hand feeling is still not good enough.

SUMMARY

The objective of the disclosure is to provide a water outlet device by overcoming the above-mentioned defects or problems in the prior art, which can realize the water suspending function reliably, and is labor-saving to operate, thereby contributing to improving the usage experience of a user.

In order to accomplish the foregoing objective, the following technical solution is adopted as follows:

a water outlet device includes a water outlet body, where the water outlet body is provided with a water inflow path, a water outflow path and a mounting channel; the mounting channel extends along a first direction, one end of the mounting channel is communicated with the water inflow path and the other end of the mounting channel is a closed end, and a side wall of the mounting channel is provided with a first water passing hole communicating with the water outflow path; and a movable shaft slidably arranged in the mounting channel and driven by an external force to slide relative to the water outlet body, the movable shaft being provided with a water passing channel along the first direction, where a side wall of the water passing channel is provided with a second water passing hole; the second water passing hole is configured to be aligned with or staggered from the first water passing hole when the movable shaft slides; when the second water passing hole is staggered from the first water passing hole, the movable shaft is in seal fit with the first water passing hole, and a water storage space is formed between an end surface of a closed end of the movable shaft facing the mounting channel and the closed end of the mounting channel.

Further, when the first water passing hole and the second water passing hole are staggered along the first direction, compared with the first water passing hole, the second water passing hole is closer to the end of the mounting channel for communicating with the water inflow path.

Further, along the first direction, an area of the second water passing hole on a cross profile perpendicular to the first direction increases towards a side of the water inflow path.

Further, along the first direction, a length of the second water passing hole is greater than a length of the first water passing hole.

Further, the water outlet body is circumferentially provided with several first water passing holes, the movable shaft is circumferentially provided with several second water passing holes formed at intervals, and the second water passing holes respectively correspond to the first water passing holes.

Further, an inner wall of the mounting channel is provided with a sealing portion arranged around a hole edge of the first water passing hole, and the sealing portion is configured to be in seal fit with an outer side wall of the movable shaft.

Further, the water outlet device further includes a push button, where the push button includes a connecting portion and a push plate which are integrally formed; the connecting portion penetrates through the side wall of the water outlet body and extends into the mounting channel to form a position-limiting connection with the movable shaft along the first direction, and the push plate is located outside the water outlet body and is driven by another external force.

Further, the water outlet body includes a housing, a fixed seat, a water inflow member and a retainer ring, where the housing is provided with a handle portion internally provided with a cavity extending along the first direction; one end of the cavity is provided with a partition wall, and the other end of the cavity is an opened end; a surface of the partition wall facing the opened end of the cavity is provided with an annular connecting wall extending along the first direction; the fixed seat is hermetically inserted into the cavity and defines a first water outflow channel with the handle portion, and the first water outflow channel forms a portion of the water outflow path, an end portion of the fixed seat hermetically abuts against the connecting wall, and the fixed seat is internally provided with a through hole along the first direction; side walls of the fixed seat and the housing both are provided with movable holes for the push button to penetrate through; a portion of the water inflow member stretches into the cavity and is detachably, hermetically and fixedly connected to the housing, and the water inflow member is provided with the water inflow path and an insertion hole communicating with each other along the first direction; the insertion hole right faces the through hole; and the retainer ring is hermetically abutted between the fixed seat and the end surface of the water inflow member along the first direction, and the retainer ring is provided with the first water passing hole; and a center hole of the connecting wall, the through hole, a center hole of the retainer ring and the insertion hole are successively communicated to form the mounting channel.

Further, the housing further includes a water discharging portion fixedly connected to an end of the handle portion away from the opened end of the cavity and internally provided with a second water outflow channel; and the second water outflow channel is communicated with the first water outflow channel to form the water outflow channel, and a water outflow direction of the water outflow path is perpendicular to the first direction.

Further, an outer side wall of the water outlet body is provided with a chute for the push plate to slide, two end portions of a bottom of the chute are respectively provided with a first identifier and a second identifier, and the first identifier and the second identifier are respectively used for indicating the connection or disconnection between the water inflow path and the water outflow path.

Compared with the prior art, the above-mentioned technical solution has the following beneficial effects:

1. When the water outlet device needs to discharge water, the movable shaft is pushed by an external force till the second water passing hole and the first water passing hole are aligned with each other, and at the time, the water flow flowing into the mounting channel from the water inflow path will reach the second water passing hole via the water passing channel, and finally enters the water outflow path from the first water passing hole and flows out from the water outflow path; when it needs to suspend the water discharge from the water outlet device, the movable shaft is pushed by an external force till the second water passing hole is staggered from the first water passing hole along the first direction, and at the time, the outer wall of the movable shaft is in seal fit with the first water passing hole, thus the water flow flowing into the mounting channel from the water inflow path will not flow out from the first water passing hole, thereby suspending water discharge reliably. Moreover, since the water storage space and the end of the mounting channel away from the water storage space both are filled with water, two ends of the movable shaft bear water pressure effects, and the water pressure on the end of the movable shaft located at the side of the water storage space can withstand the water inflow pressure at the other end thereof. Therefore, when it is needed to reestablish the communication between the water inflow path and the water outflow path, the movable shaft can be driven to move by applying little force, so that the water outlet device is labor-saving to operate, and the degree of satisfaction of the user is high.
2. When the first water passing hole and the second water passing hole are staggered along the first direction, compared with the first water passing hole, the second water passing hole is closer to the end of the mounting channel for communicating with the water inflow path. Due to the design, it is more easily for the movable shaft easily to form a larger water storage space with the mounting channel when the water inflow path and the water outflow path are disconnected, so that the water storage amount of the water storage space is enhanced, and the water pressure on the movable shaft at the side of the water storage space is further enhanced.
3. Along the first direction, the area of the second water passing hole in the cross-profile perpendicular to the first direction is increasing towards the side of the water inflow path. Therefore, in the process that the movable shaft is gradually switched from closing the water path to opening the water path, the area of the second water passing hole for communicating with the first water passing hole can be increasing, and in the process that the movable shaft is gradually switched from opening the water path to closing the water path, the area of the second water passing hole for communicating with the first water passing hole can be decreasing. In the switching process, the change of the water passing area of the second water passing hole for communicating with the second water passing hole is significance, and therefore, a good stepless flow rate regulation effect can be achieved.
4. Along the first direction, the length of the second water passing hole is greater than the length of the first water passing hole, so that the adjustable range of the flow rate is larger and the using effect is better.
5. Since the water outlet body is circumferentially provided with several first water through holes and the movable shaft is circumferentially provided with a plurality of second water through holes respectively being corresponding to the first water passing holes, the water passing area and the water flow discharged while the water path is opened can be increased, and the cleaning demand can be better satisfied.
6. The inner wall of the mounting channel is provided with the sealing portion arranged around the hole edge of the first water passing hole, and the sealing portion can be in seal fit with the outer wall of the movable shaft, so that the water outlet device can reliably suspend the water with a sample structure when the first water passing holes and the second water passing holes are staggered, and therefore, water leakage phenomenon is avoided.
7. By arranging the push button, the user can operate the movable shaft conveniently, and the push button is simple in structure and can bring good operating experience to the user.
8. The water outlet body includes the housing, the fixed seat, the water inflow member and the retainer ring. When assembling the water outlet body, the fixed seat, the retainer ring and the water inflow member are successively mounted in the housing to form the required structure. Moreover, since the water inflow member is threadedly connected to the housing fixedly, the entire structure is convenient to disassemble, assemble and maintain.
9. The water discharging portion is internally provided with the second water outflow channel, the second water outflow channel and the first water outflow channel are communicated with each other and form the water outflow path, and the water outflow direction of the second water outflow channel is perpendicular to the first direction, that is, the water outflow direction of the water discharging portion is perpendicular to the extension direction of the handle portion. Therefore, when holding the handle portion, the user can control the water outflow angle conveniently and can clean a specific position.
10. The chute arranged can play a certain role in positioning the push plate; by arranging the first identifier and the second identifier, the user can identify the state of the movable shaft conveniently, and thus, the user can be better guided to switch the position of the push plate toward a required direction according to demand.

BRIEF DESCRIPTION OF THE DRAWINGS

To make the technical solutions provided in the embodiments of the disclosure more clearly illustrated, several accompanying drawings required by the embodiments for description are briefly introduced as follows.

DESCRIPTION OF THE EMBODIMENTS

Unless otherwise defined in the claims and specification of the disclosure, the terms "first", "second", or "third" and so on are used to distinguish different objects, not used to describe a specific order.

Unless otherwise defined in the claims and specification of the disclosure, for location words, such as the use of the terms "center", "transverse", "perpendicular", "horizontal", "vertical", "top", "bottom", "inner", "outer", "upper", "lower", "front", "rear", "left", "right", "clockwise", "counterclockwise", and other indication orientations or positional relationships are based on the orientations and positional relationships shown in the drawings, are provided to facilitate the description of the disclosure and simplify the description, and are not intended to indicate or imply that the indicated device or element must have a specific orientation or be constructed and operated in a specific orientation.

In the claims and the description of the disclosure, unless otherwise explicitly defined, if the term "fixed connection" or "fixedly connected" is used, it should be understood in a broad sense, that is, any connection method without displacement relationship and relative rotation relationship between the two, that is, including non-removable fixed connection, removably fixed connection, connected as a whole, and fixed connection through other devices or components.

In the claims and specification of the disclosure, if the words "include", "have", and variations thereof are used, it is intended to indicate "include but not be limited to".

Clear and intact description will be made on the technical according to the embodiment below in combination with the accompanying drawings.

With reference to FIG. 1 to FIG. 10, a water outlet device according to the embodiment is represented. As shown in FIG. 1 to FIG. 10, taking a shower head as an example, the water outlet device according to the embodiment includes a water outlet body 1, a movable shaft 2, a push button 3, a first V-shaped seal ring 4 and a second V-shaped seal ring 5. It should be understood that the water outlet device can also be a spray gun, a faucet or a shower head and the like.

The water outlet body 1 is provided with a water inflow path 10a, a water outflow path 10b and a mounting channel 10c, where the mounting channel 10c extends along a first direction, one end of the mounting channel 10c is communicated with the water inflow path 10a and the other end of the mounting channel 10c is closed, and a side wall of the mounting channel 10c is provided with a first water passing hole 141 communicating with the water outflow path 10b.

Specifically, in the embodiment, the water outlet body 1 comprises a housing 11, a fixed seat 12, a water inflow member 13, a retainer ring 14 and a water outflow surface cover 15.

The structure of the housing 11 is as shown in FIG. 1, FIG. 2 and FIG. 8 to FIG. 10, and the housing 11 is of an L-shaped tubular structure and includes a handle portion 111 and a water discharging portion 112.

The handle portion 111 extends along the first direction and is internally provided with a cavity 1110 extending along the first direction, and one end of the cavity 1110 is provided with a partition wall 1111 and the other end of the cavity 1110 is an opened end; the partition wall 1111 is perpendicular to the first direction, a surface of the partition wall 1111 facing the opened end of the cavity 1110 is provided with an annular connecting wall 1112 extending along the first direction, the connecting wall 1112 is arranged on the partition wall 1111 in the middle, an outer wall of the connecting wall is provided with an annular first step surface 1112a arranged away from the partition wall 1111, and the first step surface 1112a is used for forming sealed abutment with the fixed seat 12. A third water passing hole 1111a is further formed on the partition wall 1111 at the periphery of the connecting wall 1112, and the third water passing hole 1111a forms a part of the water outflow path 10b. A side wall of the handle portion 111 is further provided with a movable hole penetrating to the cavity 1110, the movable hole is for the push button 3 to penetrate through, and in addition, the fixed seat 12 is also provided with a movable hole for the push button 3 to penetrate through. In order to facilitate description, in the embodiment, the movable holes in the handle portion 111 and the fixed seat 12 are respectively defined as a movable hole I 1113 and a movable hole II 126. An outer side wall of the handle portion 111 is further provided with a chute 1115 for the push button 3 to slide; the movable hole I 1113 is formed in the bottom center of the chute 1115; in addition, two end portions of the bottom of the chute 1115 are respectively provided with a first identifier 1115a and a second identifier 1115b, the first identifier 1115a and the second identifier 1115b are respectively used to indicate that the water inflow path 10a and the water outflow path 10b are connected or disconnected, so that it is convenient for the user to identify the state of the water outlet device, and thus, the user can be better guided to switch the push button 3 toward a required direction according to demand.

The water discharging portion 112 is perpendicularly and fixedly connected to one end of the handle portion 111 and is specifically fixedly connected to the end of the handle portion 111 away from the opened end of the cavity 1110, and is internally provided with a second water outflow channel 1121; the second water outflow channel 1121 further forms a part of the water outflow path 10b, and is communicated with a third water passing hole 1111a; in the embodiment, a water outflow end of the second water outflow channel 1121 is located at the end of the water discharging portion 112 away from the handle portion 111. It thus can be known that the water outflow direction of the second water outflow channel 1121 is perpendicular to the first direction. Thus, under a condition that the user holds the handle portion 111, the user can adjust the angle of the water discharging portion 112 by rotating the handle portion 111 so as to conveniently adjust the water outflow angle of the second water outflow channel 1121, thus realizing the washing of a specific part.

Figure 8:
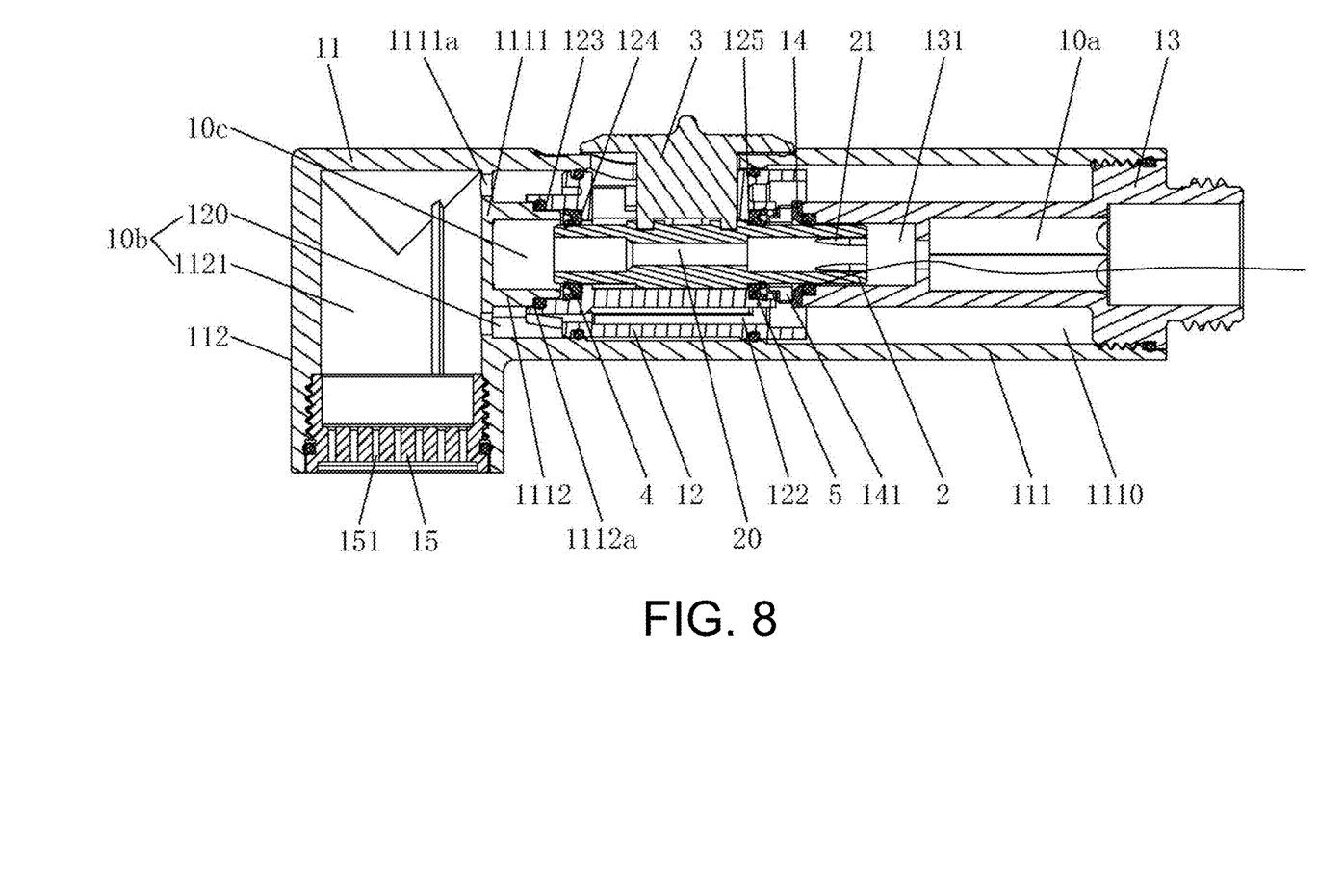
FIG. 8 is a profile schematic structural diagram of a water outlet device according to an embodiment of the disclosure while the water path is in a closed state.
Figure 9:
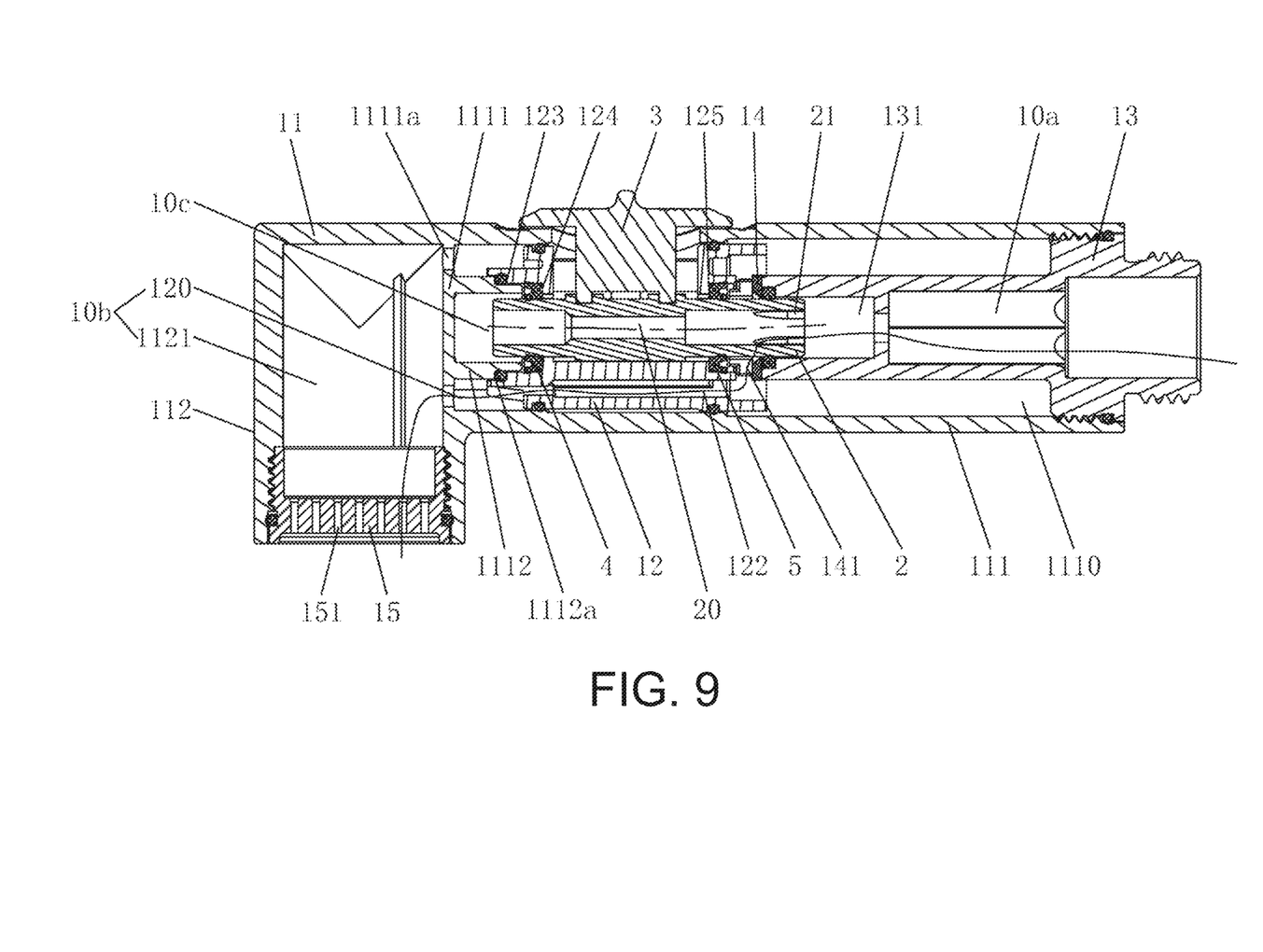
FIG. 9 is a profile schematic structural diagram of a water outlet device according to an embodiment of the disclosure while the water path is not completely opened.
Figure 10:
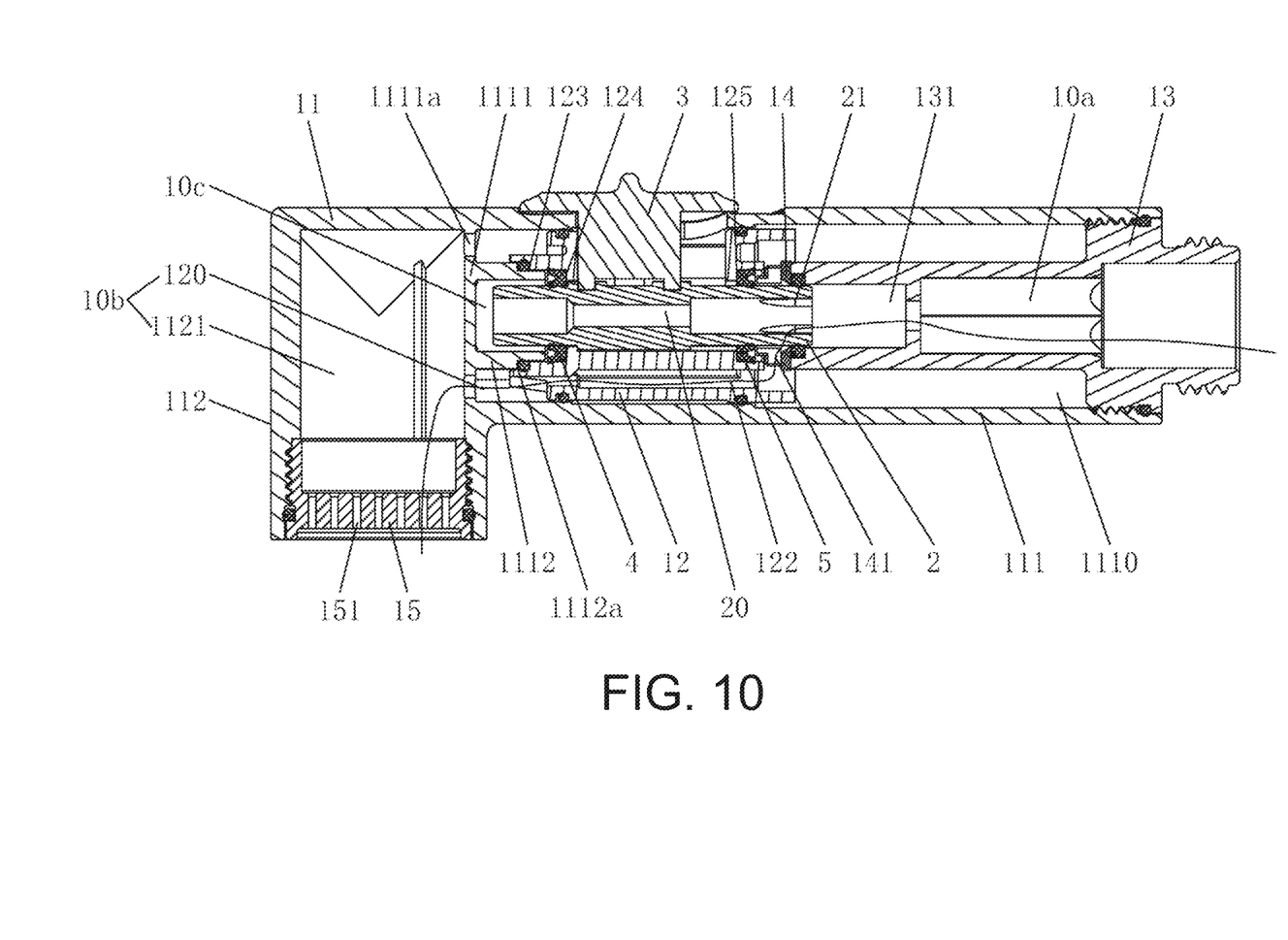
FIG. 10 is a profile schematic structural diagram of a water outlet device according to an embodiment of the disclosure while the water path is completely opened.

The structure of the water outflow surface cover 15 is as shown in FIG. 8 to FIG. 10, the water outflow surface cover 15 is threadedly connected to the inner wall of the water discharging portion 112 and is flush with an end surface of the water discharging portion 112, the outer wall of the water outflow surface cover 15 is in seal fit with the inner wall of the water discharging portion 112 by sleeving an annular seal ring thereon, and the water outflow surface cover 15 is provided with several water outflow holes 151 communicated with the second water outflow channel 1121.

The fixed seat 12 can be hermetically inserted into the cavity 1110 from the opened end of the cavity 1110, and defines with the handle portion 111 a first water outflow channel 120 forming a portion of the water outflow path 10b, an end portion of the fixed seat 12 hermetically abuts against the connecting wall 1112, and the fixed seat 12 is internally provided with a through hole 121 along the first direction, and the through hole 121 is used for the movable shaft 2 to penetrate through. Therefore, the side wall of the fixed seat 12 is further provided with the movable hole II 126 for the push button 3 to penetrate through to ensure that the movable shaft 2 can be driven by the push button 3 to slide.

Specifically, the structure of the fixed seat 12 is as shown in FIG. 3 and FIG. 8 to FIG. 10, and the fixed seat 12 is of a tube structure and is coaxially inserted into the cavity 1110. When the fixed seat is inserted in place, the movable hole II 126 and the movable hole I 1113 are aligned with each other to ensure that the push button 3 can penetrate through. The outer wall of the fixed seat 12 is sleeved with annular seal rings respectively on two sides of the movable hole II 126, and the seal rings hermetically abut against the inner wall of the cavity 1110, so that the fixed seat 12 is in seal fit with the handle portion 111 and prevents a water flow seeping from the movable hole II 126 and the movable hole I 1113. A center hole of the fixed seat 12 forms the through hole 121. An end portion of one side of the fixed seat 12 facing the partition wall 1111 is sleeved onto the connecting wall 1112, the inner wall of the portion sleeved onto the connecting wall 1112 is provided with an annular second step surface 123, the second step surface 123 is corresponding to the first step surface 1112a, and the second step surface 123 and the first step surface 1112a hermetically abut against each other by abutting an annular seal ring, thereby realizing a hermetic abutting relation between the end portion of the fixed seat 12 and the connecting wall 1112. The side wall of the fixed seat 12 is provided with a first water channel 122 along the first direction, and the first water channel 122, a gap between the outer side wall of the connecting wall 1112 and the inner side wall of the cavity 1110 and the third water passing hole 1111a are successively communicated to form the first water outflow channel 120. Therefore, the fixed seat 12 and the handle portion 111 define the first water outflow channel 120 forming a portion of the water outflow path 10b, and the first water outflow channel 120 and the second water outflow channel 1121 are communicated to form the water outflow path 10b. In addition, the inner wall of the fixed seat 12 is further provided with a first abutting surface 124 and a second abutting surface 125 that are both annular, and the first abutting surface 124 and the second abutting surface 125 are respectively arranged on two end portions of the fixed seat 12, where the first abutting surface 124 faces the partition wall 1111 and is suitable for being matched with the end surface of the connecting wall 1112 to limit displacement of the first V-shaped seal ring 4 along the first direction, and the second abutting surface 125 faces the side of the opened end of the cavity 1110 and is suitable for being matched with the retainer ring 14 to limit displacement of the second V-shaped seal ring 5 along the first direction.

Figure 3:
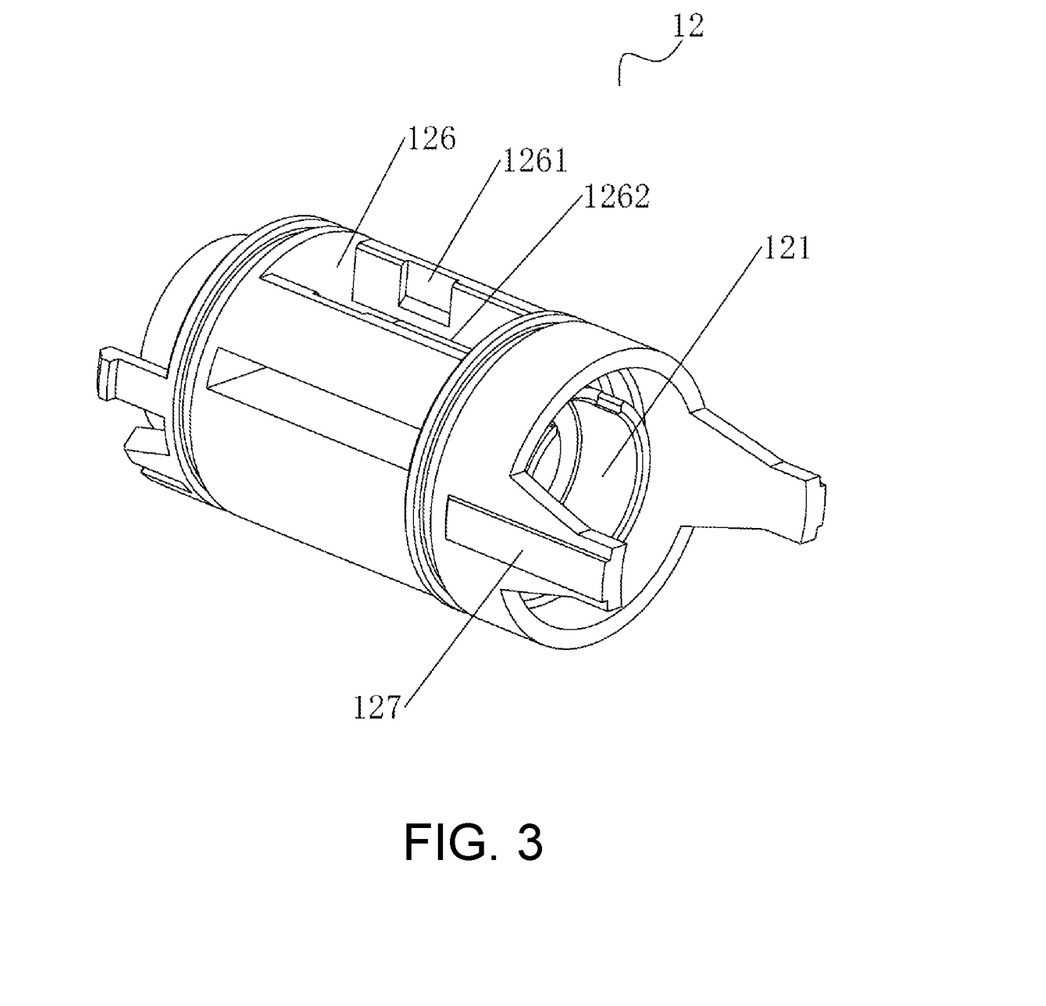
FIG. 3 is a schematic structural diagram of a fixed seat in a water outlet device according to an embodiment of the disclosure.
Figure 4:
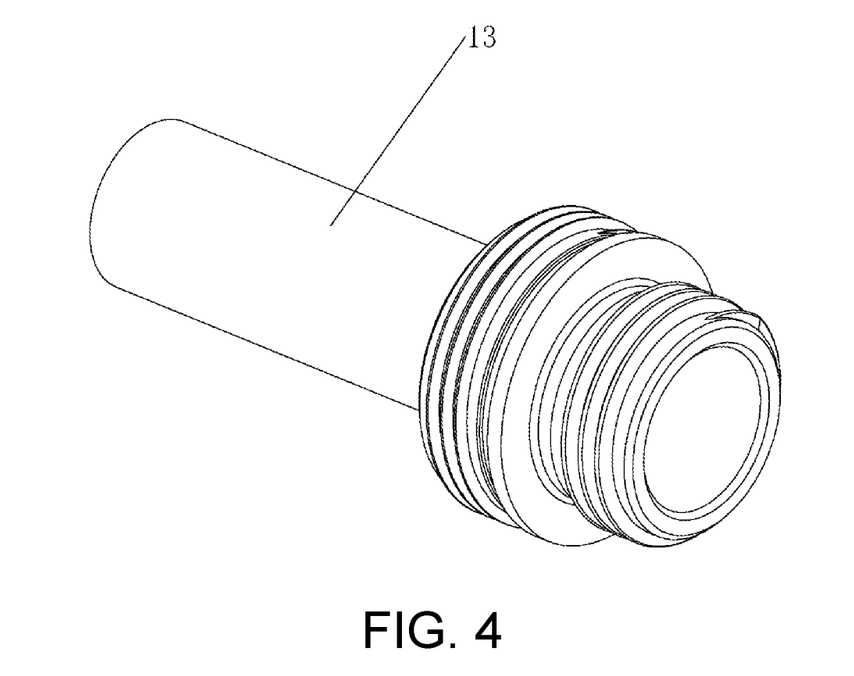
FIG. 4 is a schematic structural diagram of a water inflow member in a water outlet device according to an embodiment of the disclosure.
Figure 5:
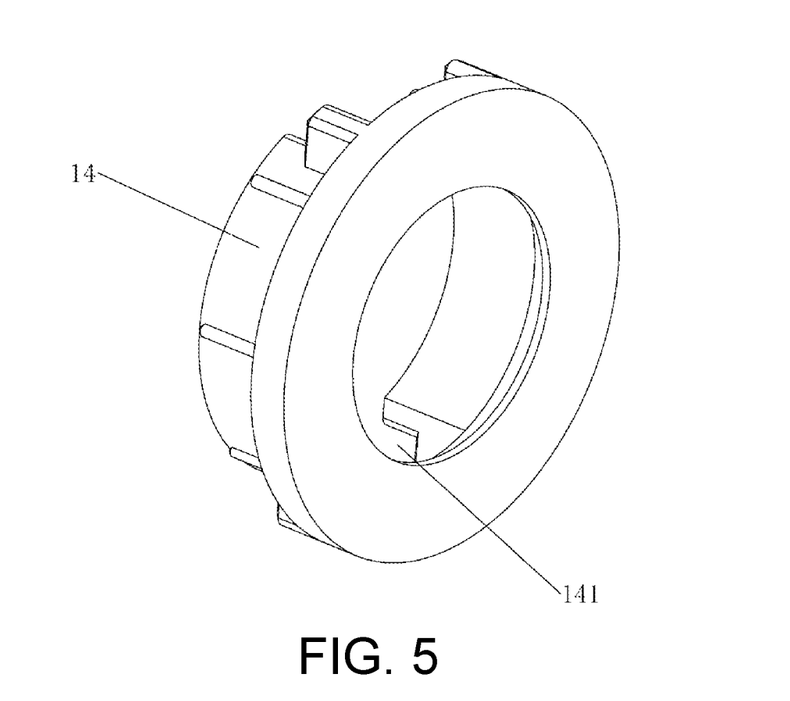
FIG. 5 is a schematic structural diagram of a retainer ring in a water outlet device according to an embodiment of the disclosure.
Figure 6:
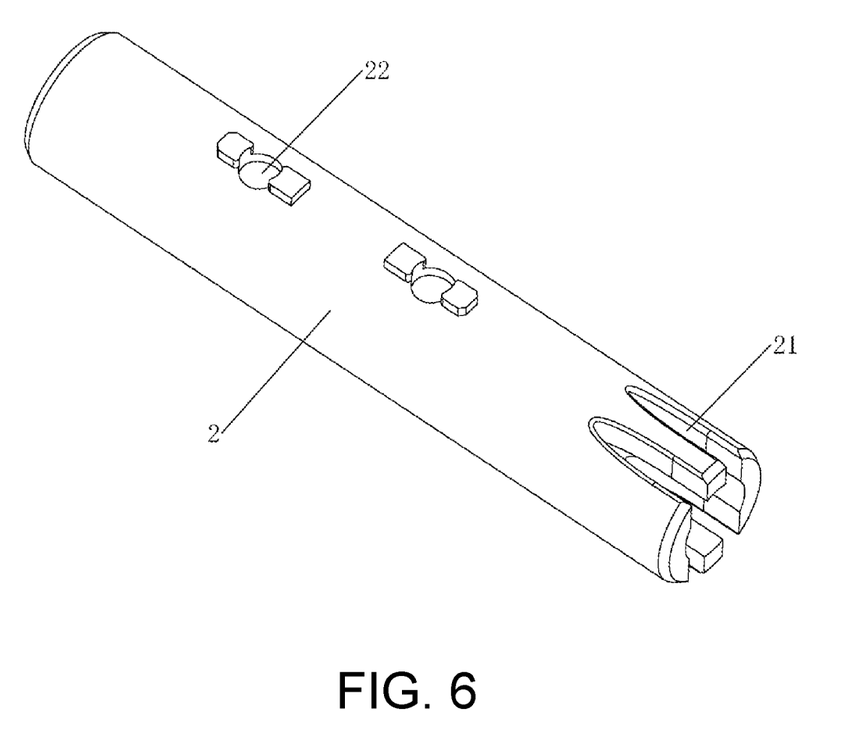
FIG. 6 is a schematic structural diagram of a movable shaft in a water outlet device according to an embodiment of the disclosure.

Preferably, in order to conveniently position a circumferential position of the fixed seat 12 in the cavity 1110 and prevent a condition that the movable hole I 1113 and the movable hole II 126 are staggered from each other as the fixed seat 12 rotates relative to the handle portion 111, in the embodiment, the outer wall of the fixed seat 12 is provided with a rotation stopping protrusion 127 extending along the first direction; the inner side wall of the cavity 1110 is provided with a rotation stopping groove 1114 matched with the rotation stopping protrusion 127; the rotation stopping groove 1114 extends along the first direction to ensure that in the process that the fixed seat 12 enters from the opened end of the cavity 1110 to abut against the connecting wall 1112, the rotation stopping groove 1114 can always play the role of stopping the rotation of the fixed seat 12 and guiding the fixed seat 12.

The movable hole II 126 penetrates through the outer wall and the center hole of the fixed seat 12 along the direction perpendicular to the axis of the fixed seat 12, two opposite side walls on the movable hole II 126 are both provided with guide slots 1261 and clamping surfaces 1262, the guide slots 1261 extend perpendicular to the axis of the fixed seat 12, the top ends of the guide slots 1261 extend to the outer side wall of the fixed seat 12, and the top ends of the guide slots 1261 are provided with inclined guide surfaces. The clamping surface 1262 is arranged below the guide slot 1261, faces the side away from the guide slot 1261 and extends along the first direction.

A part of the water inflow member 13 stretches into the cavity 1110 and is detachably, hermetically and fixedly connected to the housing 11, and the water inflow member 13 is provided with the water inflow path 10a and an insertion hole 131 communicated with each other along the first direction; the insertion hole 131 right faces the through hole 121.

Specifically, the structure of the water inflow member 13 is as shown in FIG. 4 and FIG. 8 to FIG. 10. The water inflow member 13 is of a tube structure and partially stretches into the cavity 1110 from the opened end of the cavity 1110, and the portion of the water inflow member 13 located in the cavity 1110 is threadedly connected to the inner wall of the cavity 1110 by way of screw thread fit and the screw joint portion of the water inflow member 13 further forms seal fit with the inner wall of the cavity 1110 by sleeving the annular seal ring on the outer wall of the water inflow member 13. The other part of the water inflow member 13 stretches out of the opened end of the cavity 1110 and is connected to an external water inflow hose to receive water supply. The water inflow member 13 is provided with the water inflow path 10a and the insertion hole 131 along the first direction, and the insertion hole 131 is closer to the side of the fixed seat 12 and faces the through hole 121 of the fixed seat 12 when the water inflow member 13 and the handle portion 111 are threadedly connected in place.

The retainer ring 14 is as shown in FIG. 5 and FIG. 8 to FIG. 10, is of an annular structure and is coaxially arranged between the fixed seat 12 and the water inflow member 13 and is abutted between the fixed seat 12 and the end surface of the water inflow member 13 along the first direction, the end of the retainer ring 14 abutted against the fixed seat 12 forms a seal fit relation with the fixed seat 12 through the second V-shaped seal ring 5, and the end of the retainer ring 14 abutting against the water inflow member 13 forms a seal fit relation with the water inflow member 13 through the annular seal ring. The side wall of the retainer ring 14 is provided with the first water passing hole 141. When the fixed seat 12, the retainer ring 14 and the water inflow member 13 are mounted in place in the cavity 1110, the center hole of the connecting wall 1112, the through hole 121, the center of the retainer ring 14 and the insertion hole 131 coaxially extend along the first direction and are successively communicated to form the mounting channel 10c, the partition wall 1111 forms a closed end of the mounting channel 10c, and the mounting channel 10c is used for mounting the movable shaft 2. It can be known from the structure that the first water passing hole 141 is communicated with the mounting channel 10c and the first water outflow channel 120, that is, the side wall of the mounting channel 10c is provided with the first water passing hole 141 communicating with the water outflow path 10b. Preferably, in order to increase a flow rate passing through, the retainer ring 14 is circumferentially provided with several first water passing holes 141, that is, the water outlet body 1 is circumferentially provided with several first water passing holes 141. The more the first water passing holes 141 are, the greater the flow rate of the water output is, and the washing demand therefore will be better met.

While assembling the above mentioned structure, under a condition that the rotation stopping protrusion 127 on the fixed seat 12 is matched with the rotation stopping groove 1114, the fixed seat 12 is inserted into the cavity 1110 from the opened end of the cavity 1110, then the retainer ring 14 and the water inflow member 13 are also successively mounted in the cavity 1110 from the opened end of the cavity 1110, and the water inflow member 13 is rotated and is threadedly and fixedly connected to the inner wall of the cavity 1110; the water outflow surface cover 15 is threadedly connected to a corresponding position of the water discharging portion 112 to assemble the required water outlet body 1. The structure is simple, convenient to assemble and disassemble, and is easy to maintain during use.

The movable shaft 2 is slidably arranged in the mounting channel 10c and is configured to drive by an external force to slide relative to the water outlet body 1, and is provided with a water passing channel 20 along the first direction, where a side wall of the water passing channel is provided with a second water passing hole 21; the second water passing hole 21 is configured to be aligned with or staggered from the first water passing hole 141 when the movable shaft 2 slides; when the second water passing hole 21 is staggered from the first water passing hole 141, the movable shaft 2 is in seal fit with the first water passing hole 141, and a water storage space is formed between an end surface of a closed end of the movable shaft 2 facing the mounting channel 10c and the closed end of the mounting channel 10c. It should be understood that while the movable shaft 2 is moving till the second water passing hole 21 and the first water passing hole 141 are aligned with each other, since the second water passing hole 21 is communicated with the water passing channel 20 and the water inflow channel 10a, the first water passing hole 141 is communicated with the water outflow channel 10b, the water inflow channel 10a is communicated with the water outflow channel 10b at the time, and the water path is opened; while the movable shaft 2 is moving till the second water passing hole 21 and the first water passing hole 141 are staggered, the communication between the water inflow channel 10a and the water outflow channel 10b is disconnected and the water path is closed, and the open and close of the water path is realized by the slide of the movable shaft 2. It is simple in structure, low in manufacturing cost and convenient to operate.

During use, when the water outlet device needs to discharge water, the movable shaft 2 is pushed by an external force till the second water passing hole 21 and the first water passing hole 141 are aligned with each other, and at the time, the water flow flowing into the mounting channel 10c from the water inflow path 10a will reach the second water passing hole 21 via the water passing channel 20, and finally enters the water outflow path 10b from the first water passing hole 141 and flows out from the water outflow path 10b; when it needs to suspend the water discharge from the water outlet device, the movable shaft 2 is pushed by an external force till the second water passing hole 21 is staggered from the first water passing hole 141 along the first direction, and at the time, the outer wall of the movable shaft 2 is in seal fit with the first water passing hole 141, thus the water flow flowing into the mounting channel 10c from the water inflow path 10a will not flow out from the first water passing hole 141, thereby suspending water discharge reliably. Moreover, since the water storage space and the end of the mounting channel 10c away from the water storage space both are filled with water, two ends of the movable shaft 2 bear water pressure, and the water pressure on the end of the movable shaft 2 at the side of the water storage space can withstand the water inflow pressure at the other end thereof. Therefore, when it needs to reestablish the communication between the water inflow path 10a and the water outflow path 10b, the movable shaft 2 can be driven to move by applying a small force, so that the water outlet device is labor-saving to operate, and the degree of satisfaction of the user is high.

Specifically, in the embodiment, the structure of the movable shaft 2 is as shown in FIG. 6 and FIG. 8 to FIG. 10, and the movable shaft 2 is of a rod-like structure extending along the first direction, is internally provided with the water passing channel 20 penetrating through two ends of the movable shaft 2 along the first direction and is slidably arranged in the mounting channel 10c in a matching manner. The side of the movable shaft 2 facing the movable hole I 1113 and the movable hole II 126 is provided with at least one slot 22, and the slot 22 is used for forming a position-limiting connection with the push button 3 along the first direction. Preferably, in order to position the circumferential position of the movable shaft 2 conveniently, that is, in order to ensure that the slot 22 can face the movable hole I 1113 and the movable hole II 126 all the time when the movable shaft 2 is mounted in the mounting channel 10c in place, the movable shaft 2 can be provided with a positioning protrusion (not shown in the drawings) on the side wall, the hole wall of the through hole 121 of the fixed seat 12 can be provided with a positioning groove (not shown in the drawings) extending along the first direction, and the positioning groove is used for being fit with the positioning protrusion to position the movable shaft 2 and stop rotation of the movable shaft 2. In the embodiment, the side wall of the end portion of the movable shaft 2 close to the water inflow channel 10a is circumferentially provided with several second water passing holes 21 at intervals, the second water passing holes 21 are respectively corresponding to the first water passing holes 141, and the second water passing holes 21 are consistent in shape and dimension. Specifically, the second water passing hole 21 extends along the first direction and the end thereof facing the water inflow path 10a extends to the end surface of the movable shaft 2. Along the first direction, the area of the second water passing hole 21 in the cross profile perpendicular to the first direction is increasing towards the side of the water inflow path 10a, that is, in the direction away from the water inflow direction of the water inflow path 10a, the cross-sectional area of the second water passing hole 21 is increasing. Therefore, while gradually switching the movable shaft 2 from closing the water path to opening the water path, the area of the second water passing hole 21 for being communicated with the first water passing hole 141 is increasing, and while gradually switching the movable shaft 2 from opening the water path to closing the water path, the area of the second water passing hole 21 for being communicated with the first water passing hole 141 is decreasing, that is, in the process of switching the connection/disconnection state of the water path, the second water passing hole 21 can be matched with the first water passing hole 141 to achieve a good stepless flow regulation effect, and the flow rate is changing significantly. In addition, in the embodiment, along the first direction, the length of the second water passing hole 21 is greater than the length of the first water passing hole 141, so that the adjustable range of the flow rate is larger and the using effect is better.

Preferably, in the embodiment, when the first water passing hole 141 and the second water passing hole 21 are staggered along the first direction, compared with the first water passing hole 141, the second water passing hole 21 is closer to the end of the mounting channel 10c for communicating with the water inflow path 10a. Due to the design, it is more easily for the movable shaft 2 to form a larger water storage space with the mounting channel 10c when the water inflow path 10a and the water outflow path 10b are disconnected, so that the water storage amount of the water storage space is enhanced, and the water pressure on the end of the movable shaft 2 at the side of the water storage space is further enhanced.

In order to ensure the sealing property when the movable shaft 2 is matched with the mounting channel 10c, as shown in FIG. 8 to FIG. 10, the outer wall of the movable shaft 2 is sleeved with the first V-shaped seal ring 4, the second V-shaped seal ring 5 and an annular seal ring, where two ends of the first V-shaped seal ring 4 respectively abut against the end surface of the connecting wall 1112 and the first abutting surface 124, a lip-type opening of the first V-shaped seal ring 4 faces the end surface of the connecting wall 1112, and the first V-shaped seal ring 4 can prevent the water flow on the side of the water storage space from seeping towards the movable hole II 126; two ends of the second V-shaped seal ring 5 respectively abut against the second abutting surface 125 and the end surface of the retainer ring 14 facing the fixed seat 12, a lip-type opening of the second V-shaped seal ring 5 faces the end surface of the retainer ring 14, and the second V-shaped seal ring 5 can prevent the water flow located on the side, close to the water inflow path 10a of the mounting channel 10c, from seeping from the movable hole II 126; the annular seal ring is hermetically abutted between the retainer ring 14 and the water inflow member 13, and the annular seal ring and the second V-shaped seal ring 5 both hermetically abut against the outer side wall of the movable shaft 2 when the second water passing hole 21 and the first water passing hole 141 are staggered, so that the water flow in the mounting channel 10c will not seep from the first water passing hole 141. It can be known that the inner wall of the mounting channel 10c is provided with a sealing portion arranged around the hole edge of the first water passing hole 141. The sealing portion is composed of the second V-shaped seal ring 5 and the annular seal ring that both are in seal fit with the outer side wall of the movable shaft 2, so that the water outlet device can realize the water discharge suspending function reliably with a sample structure when the first water passing holes 141 and the second water passing holes 21 are staggered, and therefore, the water leakage phenomenon is avoided.

The structure of the push button 3 is as shown in FIG. 7 and FIG. 8 to FIG. 10, and the push button 3 includes a connecting portion 31 and a push plate 32 integrally formed.

Figure 7:
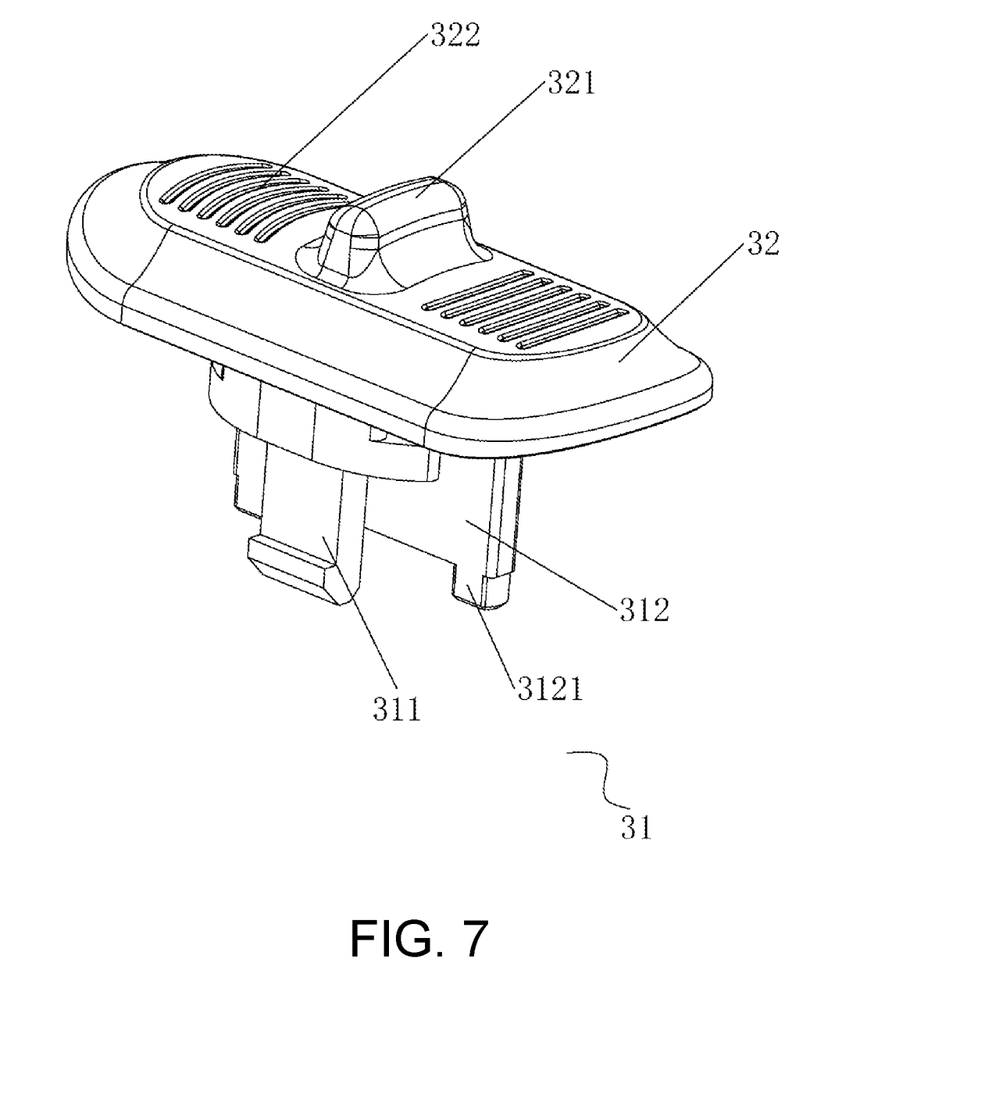
FIG. 7 is a schematic structural diagram of a push button in a water outlet device according to an embodiment of the disclosure.

The connecting portion 31 penetrates through the side wall of the water outlet body 1, stretches into the mounting channel 10c to form a position-limiting connection with the movable shaft 2 along the first direction. Specifically, the connecting portion 31 is provided with two elastic buckles 311 and an insertion portion 312 located between the two elastic buckles 311; protrusions of the two elastic buckles 311 deviate from each other, and are inserted into and cooperate with the two guide slots 1261 in the side wall of the movable hole II 126 while the connecting portion 31 penetrates through the movable hole I 1113 and is entering the movable hole II 126. With increasing of the insertion depth of the connecting portion 31, the elastic buckles 311 guided by guide surfaces at the bottom ends of the guide slots 1261 is retreating from the guide slots 1261 and is deforming till hooks of the elastic buckles 311 are at the level of the clamping surface 1262, then the deformation of the elastic buckles 311 recover and the elastic buckles 311 is clamped with the clamping surface 1262. At the time, the connecting portion 31 and the whole push button 3 cannot be separated from the water outlet body 1 along the direction perpendicular to the first direction, thereby realizing a connection between the push button 3 and the water outlet body 1. The bottom of the insertion portion 312 is provided with an insertion protrusion 3121. When the elastic buckle 311 and the clamping surface 1262 are clamped in place, the insertion protrusion 3121 is in insertion connection with the slot 22 of the movable shaft 2, thereby realizing a position-limiting connection between the push button 3 and the movable shaft 2 along the first direction. It is worth noting that since the clamping surface 1262 extends along the first direction, the cooperation relation between the elastic buckles 311 and the clamping surface 1262 can on the one hand prevent the push button 3 from being separated from the water outlet body 1, and also ensure on the other hand that the push button 3 can move reliably along the first direction and drive the movable shaft 2 to move reliably to realize the connection and disconnection of the water path.

Figure 1:
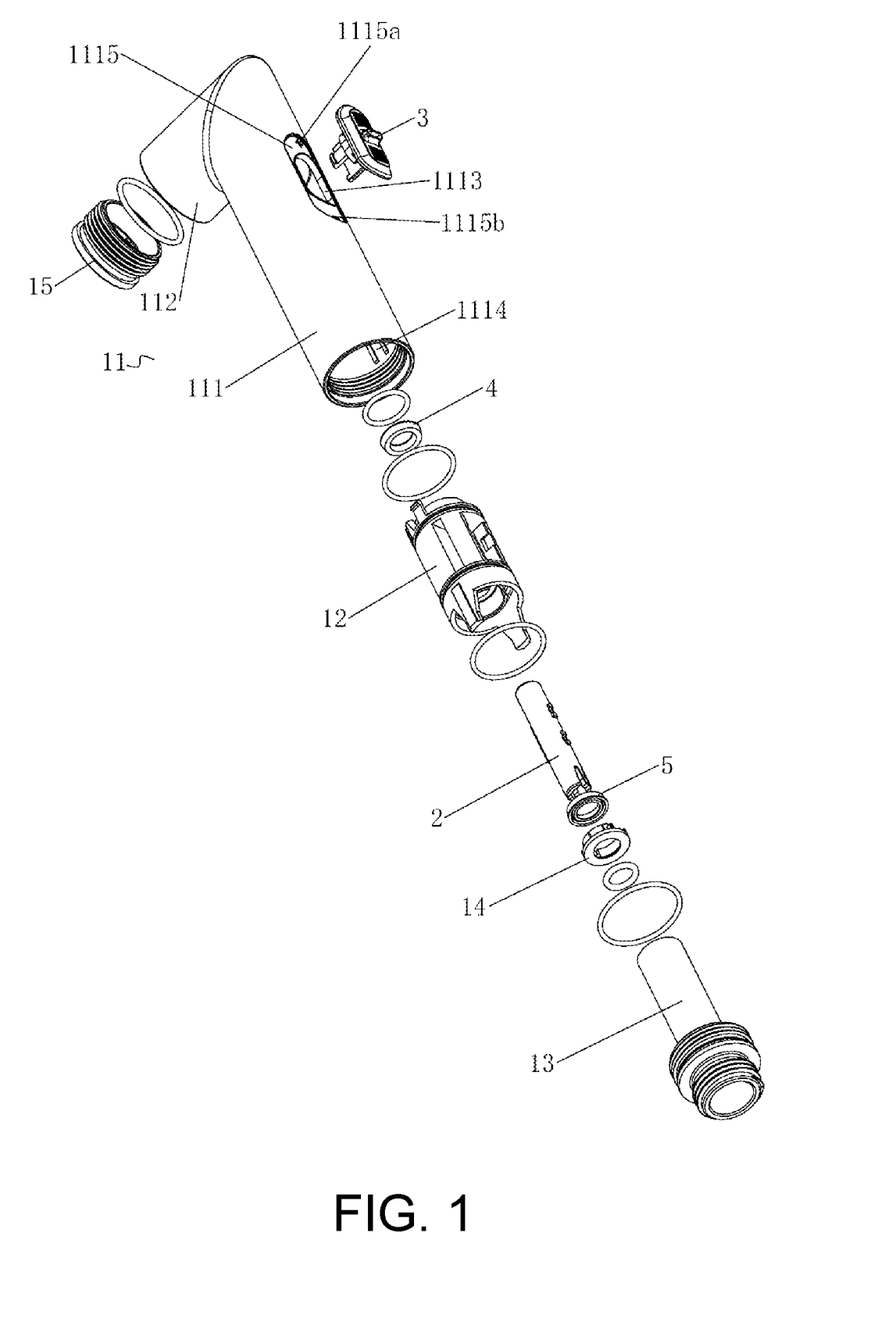
FIG. 1 is a schematic exploded view of a water outlet device according to an embodiment of the disclosure.
Figure 2:
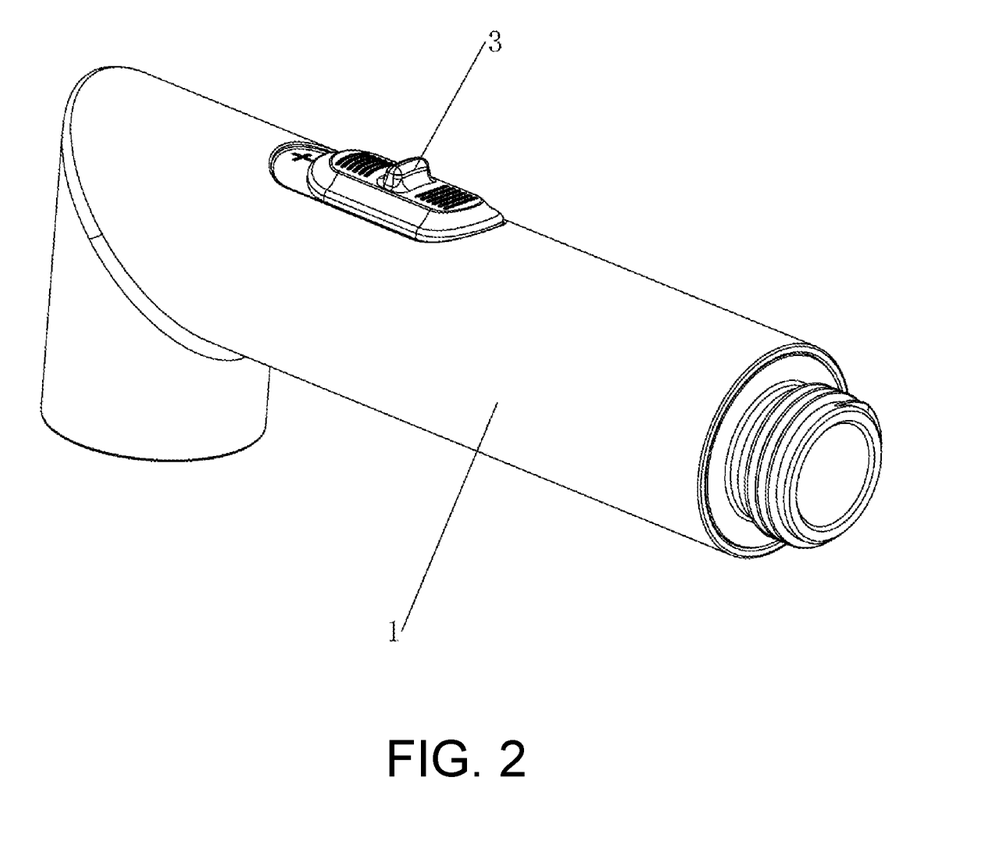
FIG. 2 is a stereogram of a water outlet device according to an embodiment of the disclosure.

The push plate 32 is located out of the water outlet body 1 and is driven by an external force. As shown in FIG. 2, the push plate 32 and the chute 1115 are matched in shape, the length of the push plate 32 is smaller than the length of the chute 1115, the push plate 32 is slidably arranged in the chute 1115, and the surface thereof for user's operation is provided with a toggle block 321 and an anti-skid grain 322.

By arranging the push button 3, the user can operate the movable shaft 2 conveniently, and the push button 3 is simple in structure and can bring good operating experience to the user.

Assembly of the water outlet device according to the embodiment is as follows:

The second step surface 123 and the first abutting surface 124 of the fixed seat 12 are respectively sleeved with the seal ring and the first V-shaped seal ring 4, the annular seal ring is sleeved on the corresponding annular groove on the outer wall of the fixed seat 12, and the fixed seat 12 is inserted into the cavity 1110 when the second step surface 123 and the first abutting surface 124 face the connecting wall 1112 in the cavity 1110. In the insertion process, it is ensured that the rotation stopping protrusion 127 on the fixed seat 12 is in insertion connection with the rotation stopping groove 1114 in the inner wall of the cavity 1110. When the fixed seat 12 cannot insert deeper, the fixed seat 12 is mounted in place, and at the time, the seal ring is hermetically abutted between the second step surface 123 and the first step surface 1112a, and the first V-shaped seal ring 4 is hermetically abutted between the end surface of the connecting wall 1112 and the first abutting surface 124.

The movable shaft 2 is inserted into the through hole 121, and in the insertion process, it is ensured that the positioning protrusion on the movable shaft 2 is matched with and in insertion connection with the positioning groove in the hole wall of the through hole 121. For mounting the movable shaft 2, the movable shaft 2 is mounted in place when the movable shaft 2 is being inserted to a state that the slot 22 in the outer wall of the movable shaft 2 is aligned with the movable hole I 1113 and the movable hole II 12.

The second V-shaped seal ring 5 is sleeved onto the movable shaft 2 till it abuts against the fixed seat 12.

The retainer ring 14 is sleeved onto the movable shaft 2 till it abuts against the second V-shaped seal ring 5, and the circumferential position of the retainer ring 14 is regulated, so that the first water passing holes 141 therein can be aligned with the second water passing holes 21 in the first direction.

The annular seal ring is sleeved onto the movable shaft 2 till it abuts against the retainer ring 14.

The water inflow member 13 is inserted into the cavity 1110 and is threadedly connected to the handle portion 111 in place, and the water inflow member 13 abuts against the retainer ring 14 and is in seal fit with the annular seal ring.

The two elastic buckles 311 on the connecting portion 31 of the push button 3 are respectively inserted into the two guide slots 1261, the push button 3 is pressed downwards and the position of the push button 3 along the first direction is regulated till the two elastic buckles 311 are respectively clamped with the two clamping surfaces 1262, and the insertion protrusion 3121 is inserted into and connected with the slot 22 in the outer wall of the movable shaft 2.

The water outflow surface cover 15 is threadedly connected to the water discharging portion 112. Finally, the part of the water inflow member 13 exposed out of the cavity 1110 is fixedly connected to an external water inflow hose to complete the assembly of the water outlet device.

A using principle of the water outlet device according to the embodiment is as follows:

when the water outlet device needs to discharge water, the toggle button is toggled to drive the movable shaft 2 to move towards the side of the partition wall 1111 in the cavity 1110 to the extreme positions of the movable hole I 1113 and the movable hole II 126, and at the time, the second water passing hole 21 is aligned with the first water passing hole 141, the water flow flowing into the mounting channel 10c from the water inflow path 10a will reach the second water passing hole 21 via the water passing channel 20, and finally enters the first water outflow channel 120 and the second water outflow channel 1121 from the first water passing hole 141 and flows out from the water outflow path 10b; when it needs to suspend the water discharge from the water outlet device, the toggle button is pulled to drive the movable shaft 2 to move towards the side of the opened end in the cavity 1110 to the other extreme positions of the movable hole I 1113 and the movable hole II 126, and at the time, the second water passing hole 21 is staggered from the first water passing hole 141 along the first direction, and the outer wall of the movable shaft 2 is in seal fit with the first water passing hole 141, thus the water flow flowing into the mounting channel 10c from the water inflow path 10a will not flow out from the first water passing hole 141, thereby suspending water discharge reliably. While the movable shaft 2 moves along the first direction and connects or disconnects the communication between the second water passing hole 21 and the first water passing hole 141, the water passing area of the second water passing hole 21 changes continuously, and flow rate regulation can be realized. Under a circumstance that the water inflow path 10a and the water outflow path 10b are disconnected, since the water storage space and the end of the mounting channel 10c away from the water storage space both are filled with water, two ends of the movable shaft 2 bear water pressure, and the water pressure on the end of the movable shaft 2 at the side of the water storage space can withstand the water inflow pressure at the other end thereof. Therefore, when it is needed to reestablish the communication between the water inflow path 10a and the water outflow path 10b, the movable shaft 2 can be driven to move by applying little force, so that the water outlet device is labor-saving to operate, and the degree of satisfaction of the user is high.

The description on the specification and embodiment are used for explaining the protection scope of the disclosure but does not constitute limitation to the protection scope of the disclosure.

What is claimed is:

1. A water outlet device, comprising:
   a water outlet body, provided with a water inflow path, a water outflow path and a mounting channel, wherein the mounting channel extends along a first direction, an end of the mounting channel is communicated with the water inflow path and the other end of the mounting channel is a closed end, and a side wall of the mounting channel is provided with a first water passing hole communicating with the water outflow path;
   a movable shaft slidably arranged in the mounting channel and driven by an external force to slide relative to the water outlet body, and the movable shaft being provided with a water passing channel along the first direction, wherein a side wall of the water passing channel is provided with a second water passing hole; the second water passing hole is configured to be aligned with or staggered from the first water passing hole when the movable shaft slides; when the second water passing hole is staggered from the first water passing hole, the movable shaft is in seal fit with the first water passing hole, and a water storage space is formed between the closed end of the mounting channel and an end surface of the movable shaft facing the closed end of the mounting channel.

2. The water outlet device according to claim 1, wherein when the first water passing hole and the second water passing hole are staggered along the first direction, and compared with the first water passing hole, the second water passing hole is closer to the end of the mounting channel for communicating with the water inflow path.

3. The water outlet device according to claim 1, wherein along the first direction, an area of the second water passing hole on a cross profile perpendicular to the first direction increases towards a side of the water inflow path.

4. The water outlet device according to claim 3, wherein along the first direction, a length of the second water passing hole is greater than a length of the first water passing hole.

5. The water outlet device according to claim 4, wherein the water outlet body is circumferentially provided with several first water passing holes, the movable shaft is circumferentially provided with several second water passing holes formed at intervals, and the second water passing holes respectively correspond to the first water passing holes.

6. The water outlet device according to claim 1, wherein an inner wall of the mounting channel is provided with a sealing portion arranged around a hole edge of the first water passing hole, and the sealing portion is configured to be in seal fit with an outer side wall of the movable shaft.

7. The water outlet device according to claim 1, further comprising a push button, wherein the push button comprises a connecting portion and a push plate, the connecting portion and the push plate are integrally formed; the connecting portion penetrates through a side wall of the water outlet body and extends into the mounting channel to form a position-limiting connection with the movable shaft along the first direction, and the push plate is located outside the water outlet body and is driven by another external force.

8. The water outlet device according to claim 7, wherein the water outlet body comprises a housing, a fixed seat, a water inflow member and a retainer ring, wherein the housing is provided with a handle portion internally provided with a cavity extending along the first direction; an end of the cavity is provided with a partition wall, and the other end of the cavity is an opened end; a surface of the partition wall facing the opened end of the cavity is provided with an annular connecting wall extending along the first direction;

the fixed seat is hermetically inserted into the cavity and defines a first water outflow channel with the handle portion, and the first water outflow channel forms a portion of the water outflow path, an end portion of the fixed seat hermetically abuts against the connecting wall, and the fixed seat is internally provided with a through hole along the first direction; side walls of the fixed seat and the housing both are provided with movable holes for the push button to penetrate through;

a portion of the water inflow member stretches into the cavity and is detachably, hermetically and fixedly connected to the housing, and the water inflow member is provided with the water inflow path and an insertion hole communicating with each other along the first direction; the insertion hole faces the through hole; and the retainer ring is hermetically abutted between the fixed seat and an end surface of the water inflow member along the first direction, and the retainer ring is provided with the first water passing hole; and a center hole of the connecting wall, the through hole, a center hole of the retainer ring and the insertion hole are successively communicated to form the mounting channel.

9. The water outlet device according to claim 8, wherein the housing further comprises a water discharging portion fixedly connected to an end of the handle portion away from the opened end of the cavity and internally provided with a second water outflow channel; and the second water outflow channel is communicated with the first water outflow channel to form the water outflow path, and a water outflow direction of the water outflow path is perpendicular to the first direction.

10. The water outlet device according to claim 7, wherein an outer side wall of the water outlet body is provided with a chute for the push plate to slide, two end portions of a bottom of the chute are respectively provided with a first identifier and a second identifier, and the first identifier and the second identifier are respectively used for indicating the connection or disconnection between the water inflow path and the water outflow path.

\* \* \* \* \*